United States Patent
Ohishi et al.

(10) Patent No.: US 6,480,551 B1
(45) Date of Patent: Nov. 12, 2002

(54) SIGNAL PROCESSING DEVICE AND METHOD FOR SWITCHING SIGNAL PROCESSORS THEREOF

(75) Inventors: Katsumi Ohishi, Tokyo (JP); Naohisa Kitazato, Tokyo (JP); Kenji Inose, Chiba (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/193,351

(22) Filed: Nov. 17, 1998

(30) Foreign Application Priority Data

Nov. 18, 1997 (JP) .............................. 9-317310
Nov. 25, 1997 (JP) .............................. 9-323085
Mar. 23, 1998 (JP) .......................... 10-073784

(51) Int. Cl.$^7$ ............................................. H04L 27/32
(52) U.S. Cl. ....................... 375/260; 375/219; 375/275; 375/316; 375/335; 340/825.01; 370/227; 370/228; 455/3.02; 455/13.1; 725/71
(58) Field of Search ................................ 375/260, 219, 375/220, 275, 316, 335, 347, 213, 214; 340/825.01–825; 370/226, 227, 228, 225; 725/63, 68, 70, 71; 455/3.01, 3.02, 3.04, 8, 13.1, 20, 131, 132

(56) References Cited

U.S. PATENT DOCUMENTS

| | | | | |
|---|---|---|---|---|
| 3,681,694 A | * | 8/1972 | Sarati ..................... | 340/825.01 |
| 4,242,756 A | * | 12/1980 | Huffman et al. ............ | 370/227 |
| 5,276,904 A | * | 1/1994 | Mutzig et al. .............. | 455/131 |
| 5,796,286 A | * | 8/1998 | Otaka ......................... | 327/307 |
| 5,933,033 A | * | 8/1999 | Shima ........................ | 327/105 |
| 5,936,660 A | * | 8/1999 | Gurantz ..................... | 348/734 |
| 5,970,386 A | * | 10/1999 | Williams .................... | 370/486 |

* cited by examiner

*Primary Examiner*—Chi Pham
*Assistant Examiner*—Khanh Tran
(74) *Attorney, Agent, or Firm*—Frommer Lawrence & Haug LLP; William S. Frommer; Gordon Kessler

(57) ABSTRACT

A digital broadcast program broadcast with a first network is transmitted to a second network. A tuner 41 selects digital broadcast signal having a predetermined transmission frequency and ECC decoder 43 obtains MPEG2 TS packet S3 as the digital broadcast data on the digital satellite broadcasting. An NIT detecting circuit 44 detects NIT from the MPEG2 TS packet S3 and a control unit 31 changes the NIT to obtain a table NITb applicable to CATV. A NIT substitution circuit 48 detects NIT from the MPEG2 TS packet S3 and substitutes table the NITb for the NIT to obtain MPEG2 TS packet S4 as the digital broadcast data on the CATV. Then, an error correct code is added to the MPEG2 TS packet S4 and the added packet S4 is modulated. Then, modulated one is frequency-converted to obtain digital broadcast signal BS-1 having a predetermined transmission frequency for the CATV. Further, a signal processing device including spare (redundant) signal processors simplified in their configurations and simple in their management may be obtained by this invention. Switch units corresponding to N signal processors in use, of switch units 33-1 through 33-(N+1) are brought into conduction, and the switch unit corresponding to the remaining one signal processor set as a spare and placed in a standby state is brought to a cut-off state. Signals outputted from the switch units 33-1 through 33- (N+1) are added together and the result of addition is sent to a CATV transmission path 13. When any of the N signal processors in use fails and a user inputs information about its failure through an operation unit 35, the faulty signal processor is newly kept in reserve and standby state. As an alternative to this, each signal processor kept in reserve and standby state up to now is placed in a used state. Thereby, it is possible to construct a spare signal processor as being unfixed.

14 Claims, 13 Drawing Sheets

SIGNAL PROCESSING DEVICE AND METHOD FOR SWITCHING SIGNAL PROCESSORS THEREOF

BACKGROUND OF THE INVENTION

This invention relates generally to a signal processing device preferably being used when digital broadcasting programs broadcast through an arbitrary network are transmitted to another network, and a switching method of signal processors suitable for use in the signal processing device. More specifically, this invention relates to a signal processing device being able to transmit the digital broadcasting programs broadcast through a first network to a second network by detecting a NIT (Network Information Table) from digital broadcast data on the first network, changing the NIT so as to be applicable to the second network and substituting said changed NIT for the NIT of digital broadcast data on the first network to obtain digital broadcast data on the second network.

Further, this invention relates to a signal processing device wherein when an used signal processor fails, a spare (redundant) signal processor is set as a used signal processor and the faulty used signal processor is set as a spare signal processor, thereby making it possible to simplify its configuration and to provide its simple management.

It is considered that the digital broadcast programs broadcast through an arbitrary network are transmitted to another network such as, the case in which a cable television enterprise or the like provides delivery service of a satellite digital multi-channel broadcast with transmitting device for modulation and conversion or the like by using its own network. In this case, however, it is impossible to transmit the digital broadcast programs broadcast through the first network to the second network only by changing modulation method with the transmitting device for modulation and conversion or the like, because the digital broadcast data includes the NIT having a physical information on a transmission path.

Accordingly, it is an object of the invention to provide a signal processing device wherein the digital broadcasting programs broadcast through a first network is transmitted to a second network by substituting the NIT suitable for the second network for the NIT of digital broadcast data on the first network.

Another object of this invention is to provide a signal processing device being capable of detecting whether said NIT is substituted correctly.

A further object of this invention is to provide a signal processing device including a spare signal processor making it possible to simplify its configuration and to provide its simple management.

SUMMARY OF THE INVENTION

According to a first aspect of the invention, we provide a signal processing device for converting a first digital broadcast signal having a predetermined transmission frequency on a first network signal into a second digital broadcast signal having a predetermined transmission frequency on a second network comprising demodulating means for demodulating said first digital modulated signal to obtain digital broadcast data, a first table-detecting means for detecting a NIT having a physical information relating to a transmission path from said digital broadcast data obtained by said demodulating means, table-changing means for changing said NIT detected by said first table-detecting means so that the table may be applicable to said second network, table substitution means for substituting the NIT changed by said table-changing means for the NIT of said digital broadcast signal obtained by said demodulating means, modulating means for modulating said digital broadcast data the NIT of which said table substitution means has substituted, to obtain a second digital modulated signal, and a first frequency-converting means for frequency-converting said second digital modulated signal to obtain a second digital broadcast signal.

The first digital broadcast signal on the first network has a predetermined transmission frequency. A frequency of said first digital broadcast signal is frequency-converted by a second frequency-converting means so that the digital modulated signal may be obtained. Then, the digital broadcast data on the first network are obtained by demodulating said digital modulated signal. Such digital broadcast data on the first network have the NIT being applicable to the first network.

The first table-detecting means detects the NIT from digital broadcast data on the first network and the table-changing means changes said NIT so that the NIT is applicable to said second network. For example, when a cable television enterprise or the like provides delivery service of a satellite digital multi-channel broadcast with transmitting device for modulation and conversion or the like by using its own network, a frequency information of the NIT is changed. Further, preferably, said table-changing means deletes an information relating to the digital broadcast signal failing to correspond to a digital information signal on said second network, from the digital broadcast signal on said first network when the number of digital broadcast signal on said second network becomes less than the one of digital broadcast signal on said first network.

The table substitution means substitutes said NIT changed so as to be applicable to the second network for the NIT of the digital broadcast data on the first network and forms the digital broadcast data on the second network. The modulating means modulates said digital broadcast data on the second network to obtain the digital modulated signal, and the first frequency-converting means frequency-converts said digital modulated signal to obtain a second digital broadcast signal to be broadcast on the second network. Thereby, a digital broadcast program broadcast through the first network may be transmitted to the second network.

Additionally, the signal processing device of this invention may be provided with a second table-detecting means for detecting a NIT from the digital broadcast data the NIT of which said table substitution means has substituted, and a substitution detecting means for comparing the NIT detected by said second table-detecting means and the NIT changed by said table-changing means and detecting whether said table substitution means substitutes the NIT correctly. When said substitution of NIT is carried out correctly, the NIT detected by the second table-detecting means is coincided with the one changed by the table-changing means.

A user may detect whether or not the substitution of NIT is carried out correctly by representing the detected result of the substitution with, for example, a display. Preferably, the signal processing device of this invention may be provided with a control means for controlling the first table-detecting means and the table substitution means so that said first table-detecting means detects the table again from the digital broadcast data modulated by said modulating means when said table substitution means detects that said substitution is carried out incorrectly, and said table substitution mean substitute the table changed by the table-changing means for the table detected again by the table-detecting means.

According to another aspect of the invention, we provide a signal processing device comprising a plurality of signal processors including at least one spare signal processor, wherein an used signal processor of said signal processors, excluding said spare signal processor, processes signals on a parallel basis, and switching control means for, when said used signal processor processing a signal fails, controlling said spare signal processors so that the one of said spare signal processors is switched to said used signal processor for processing said signal. Further, a signal processing device may be so constructed that the failed one of the signal processors is switched to the spare signal processor.

Further, according to the still another aspect of the present invention we provide a switching method of signal processors suitable for use in a signal processing device which has a plurality of signal processors respectively including tuner means and a circuit for processing signals outputted from said tuner means and allows an used signal processor, excluding a spare signal processor, of said plurality of signal processors to process broadcast signals having a transmission frequency, comprising the following steps of switching one of said spare signal processors to the signal processor for processing the broadcast signal having said one transmission frequency when said used signal processor processing a broadcast signal having one transmission frequency fails, switching said faulty one of the used signal processors to a spare signal processor, allowing a received frequency of said tuner means of said spare signal processor to coincide with a received frequency of said tuner means of said used signal processor, and allowing a processed state of said processing circuit included in said spare signal processor to coincide with a processed state of said processing circuit included in said used signal processor, and thereafter switching said spare signal processor to the used signal processor for processing the broadcast signal having said transmission frequency.

In the present invention, there is a plurality of signal processors. Of the plurality of signal processors, one or a plurality of used signal processors excluding one or a plurality of spare signal processors process one or a plurality of signals in parallel basis. When P signal processors are provided, for example, Q signal processors are set as used signal processors so as to perform signal processes on a parallel basis, whereas other (P-Q) signal processors are respectively placed in a standby state as spare signal processors.

When the one of the used signal processors fails in this state, one spare signal processor is switched to a used signal processor for processing a signal, and a faulty one signal processor is switched to a spare signal processor. Thus, the unfixed configuration of the spare (redundant) signal processor makes it unnecessary to provide changeover switches for performing switching between the used signal processors and the spare signal processor. For example, switch units for determining whether respective output signals of a plurality of signal processors should be respectively outputted, may simply be provided on the output sides of the plurality of signal processors, whereby their configuration can be simplified.

Further, since the spare (redundant) signal processors are so constructed as to be unfixed, the need for placing a faulty signal processor from the spare signal processor back onto the used signal processor is eliminated even if a failure of the faulty signal processor is removed, whereby its management becomes simple.

Preferably, in this invention, when a plurality of signal processors respectively have tuner means and circuits for processing output signals of the tuner means, and one spare signal processor is set as the used signal processor for processing a signal, for example, a received frequency or the like of the tuner means of one spare signal processor may be made coincident with that of the tuner means of faulty used signal processor. Thereafter, a switch unit provided so as to correspond to one spare signal processor may be brought into conduction. Thus, only an output signal similar to that obtained in the faulty used signal processor can be obtained from the switch unit. When the switch unit is composed of a variable attenuator, it is possible to prevent a noise from generating in switching the unit from conduction state to cutoff state and from cutoff state to conduction state.

A further understanding of the nature and advantages of the invention may be realized by reference to the following portions of the specification and drawings.

DESCRIPTION OF THE PREFERRED EMBODIMENT

Figure 1:
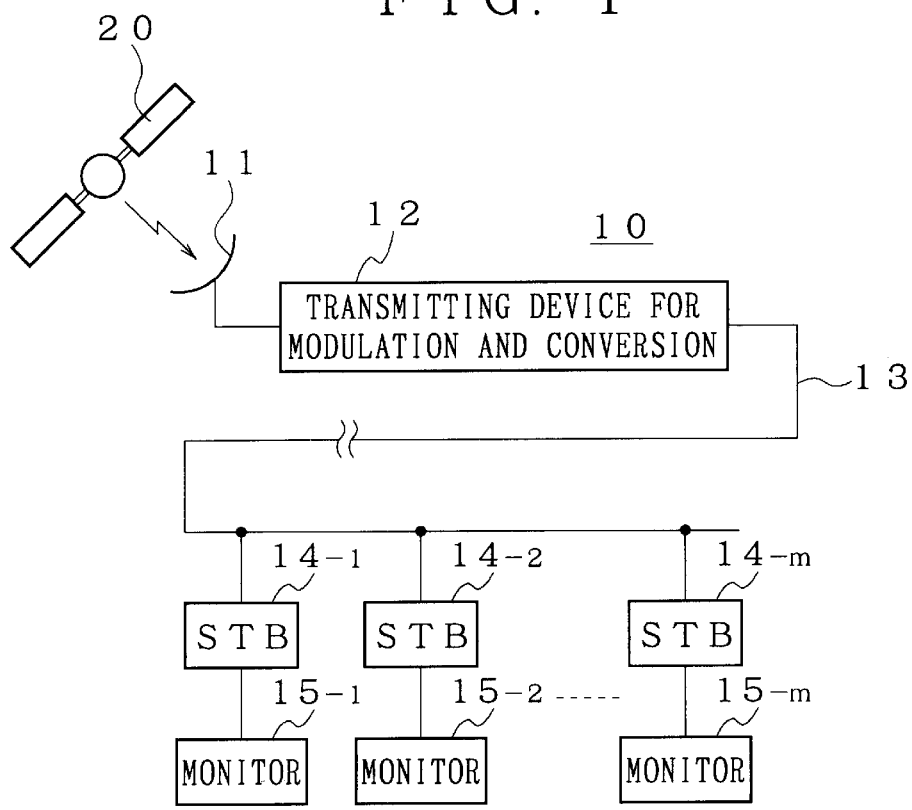
FIG. 1 is a block diagram showing a configuration of a digital CATV(Cable Television) system as a preferred embodiment of the invention.

Referring now to FIG. 1, there is shown a digital CATV system 10 as a preferred embodiment of the invention, which is used for a satellite digital multi-channel broadcast.

The system 10 comprises an antenna 11 for receiving digital broadcast signals sent from a plurality of transponders (satellite repeaters) of a communication satellite 20, and a transmitting device for modulation and conversion 12 for converting a transmission frequency of each received digital broadcast signal, and changing a modulation scheme thereof, etc. to generate a CATV digital broadcast signal and transmitting it to a transmission path 13. Incidentally, STB (Set Top Box) 14-1 through 14-m used as receiving terminals are electrically connected to the transmission path 13. Images in channels selected by these STB 14-1 through 14-m are respectively displayed on monitors 15-1 through 15-m corresponding to the STB 14-1 through 14-m.

Figures 2A, 2B:
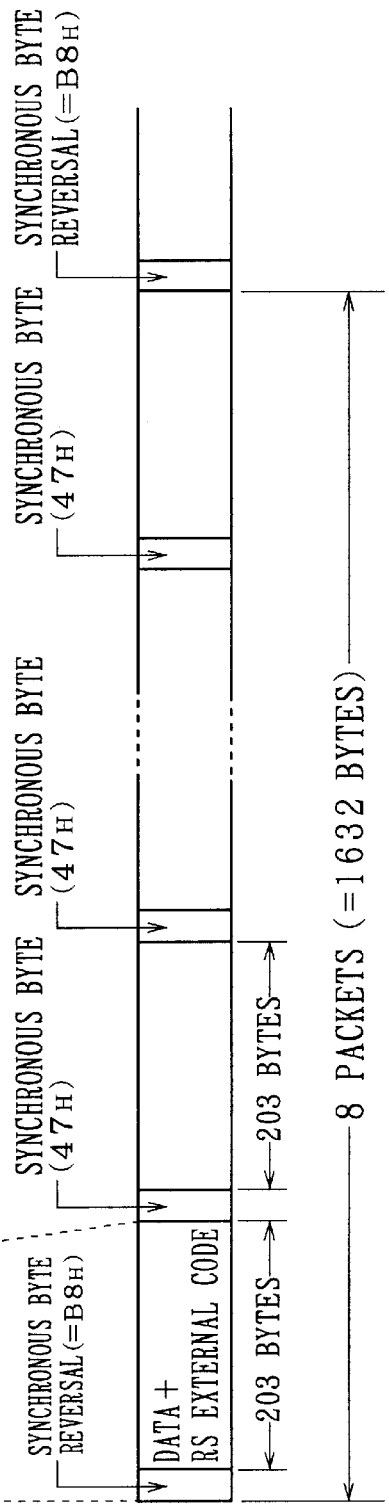
FIGS. 2A and 2B are diagrams respectively illustrating MPEG2 transport packet and a frame configuration of a DVB system.

The digital broadcast signals transmitted from the communication satellite 20 will first be explained. In the present embodiment, the digital broadcast signals are ones corresponding to a DVB (Digital Video Broadcasting) system. FIG. 2B shows a frame configuration of digital broadcast data employed in the DVB system. One frame of the digital broadcast data comprises eight MPEG2 transport packets (see FIG. 2A). In this case, by using a synchronous byte lying within each packet, one synchronous byte (=47H) every eight packets is inverted to a byte (=B8H) so that the frame synchronization thereof maybe obtained. Incidentally, an error correction code based on reed solomon (204, 188) is added to each MPEG2 transport packet (MPEG2 TS packet) The digital broadcast data shown in FIG. 2B is QPSK (Quadrature Phase Shift Keying)-modulated and thereafter frequency-converted into an SHF band, thus resulting in digital broadcast signals transmitted from the communication satellite 20.

Figure 4:
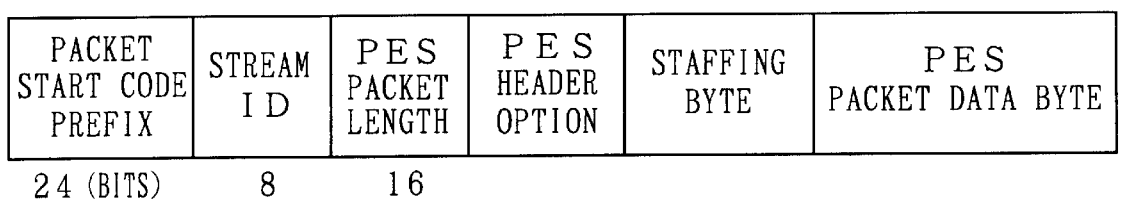
FIG. 4 is a diagram illustrating a packet structure of a PES packet.
Figure 3:
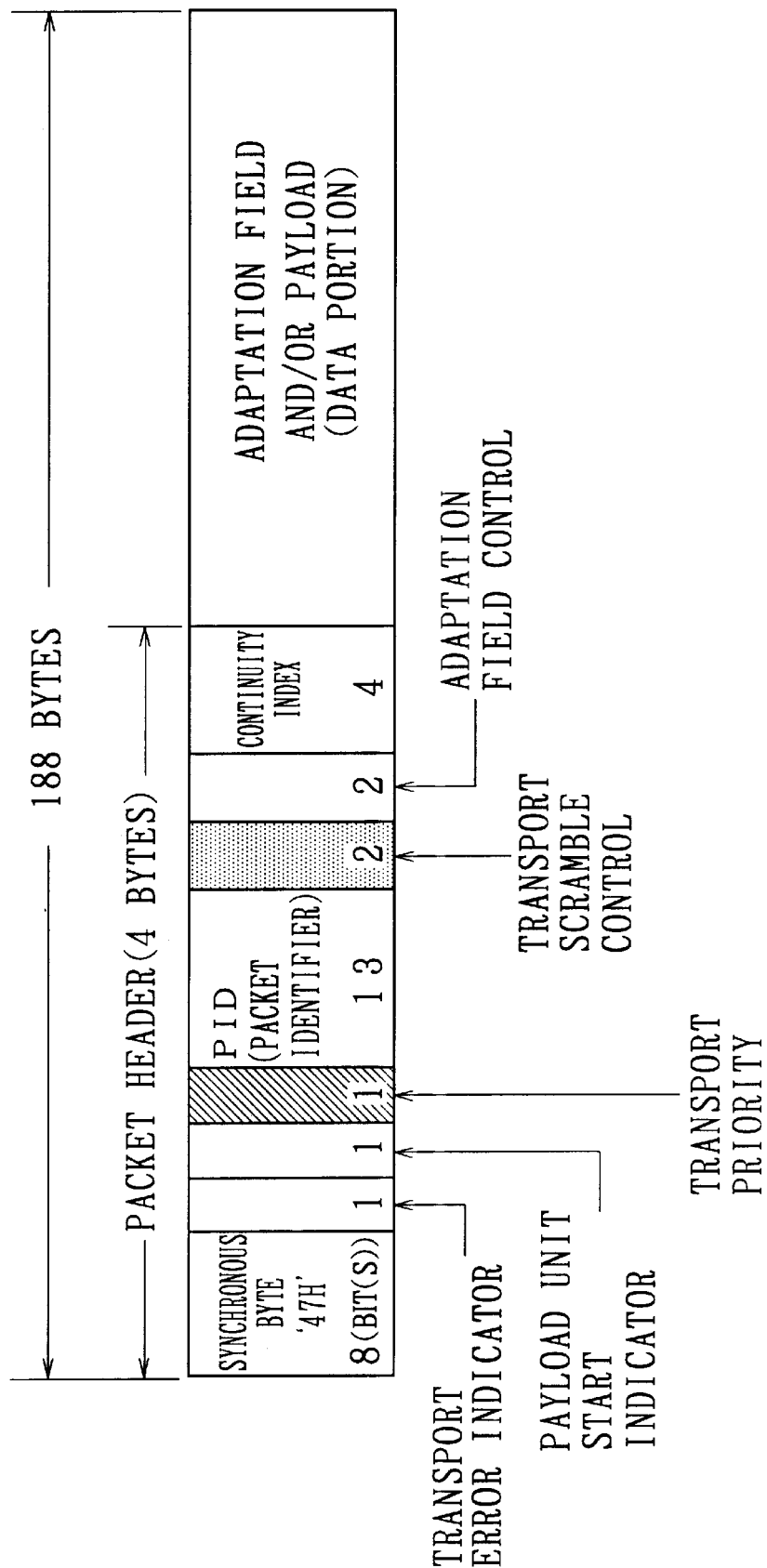
FIG. 3 is a diagram illustrating a packet structure of a MPEG2 transport packet.

FIG. 3 shows a packet configuration of an MPEG2 transport packet composed of 188 bytes. The leading four bytes of said 188 bytes constitute a packet header. A PID (Packet Identifier) indicative of the attribute of an individually provided stream (data string) of the corresponding packet is placed in the packet header. As is well known, a PES (Packetized Elementary Stream) packet indicative of a packet configuration as shown in FIG. 4 is disposed in a payload (data portion) of the MPEG2 transport packet in re-divided form. Further, a PAT (Program Association Table), a PMT (Program Map Table), an NIT (Network Information Table), etc. used as PSI (Program Specific Information) defined in an MPEG2 system are also provided in the payload.

Here, the PSI is information necessary to implement a simple station-selection operation and a program selection. The PAT indicates PID of the PMT for transmitting information about a packet constituting respective programs every program numbers (16 bits).

Figure 5:
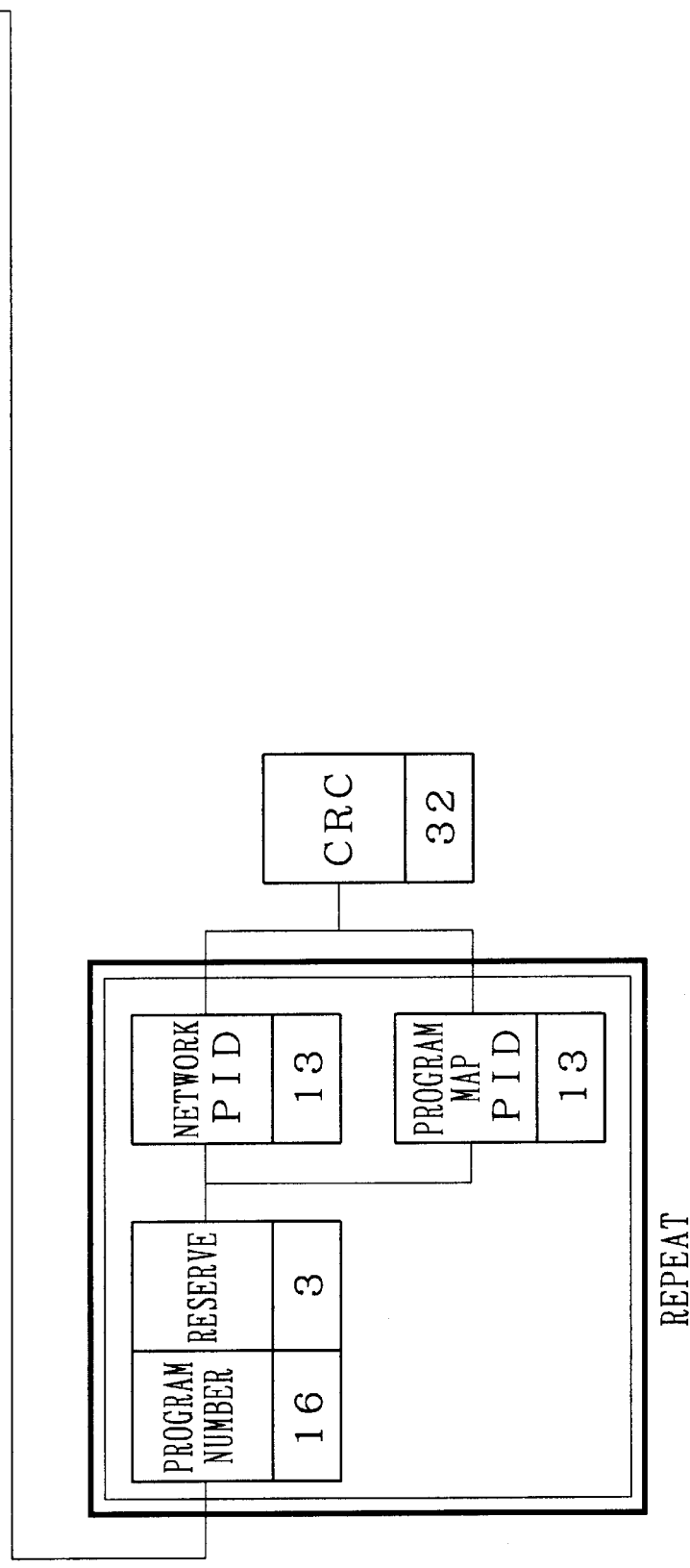
FIG. 5 is a diagram illustrating a table structure of a program association table (PAT)

FIG. 5 shows a table structure of the PAT. PID="0" is fixedly assigned as PID of the PAT itself. Principal contents thereof will be explained. A table ID indicates the type of table, which is given as "0x00" (hexadecimal notation) in the PAT. A TS (Transport Stream) ID is used to identify a stream (multiplexed coded data) and corresponds to a transponder in the case of a satellite. A version number is added or incremented each time the contents of the table is brought up to date. A current next indicator is used for identification when old and new versions are simultaneously transmitted. A program number is used to identify each individual channel. A network PID indicates the PID of the NIT when the program number is given as "0x0000". A program map PID indicates the PID of the PMT.

Further, the PMT is one used to indicate PID of a packet for transmitting a stream such as video, audio and added data constituting each program every program numbers. As described above, the PAT designates the PID of the PMT itself.

Figure 6:
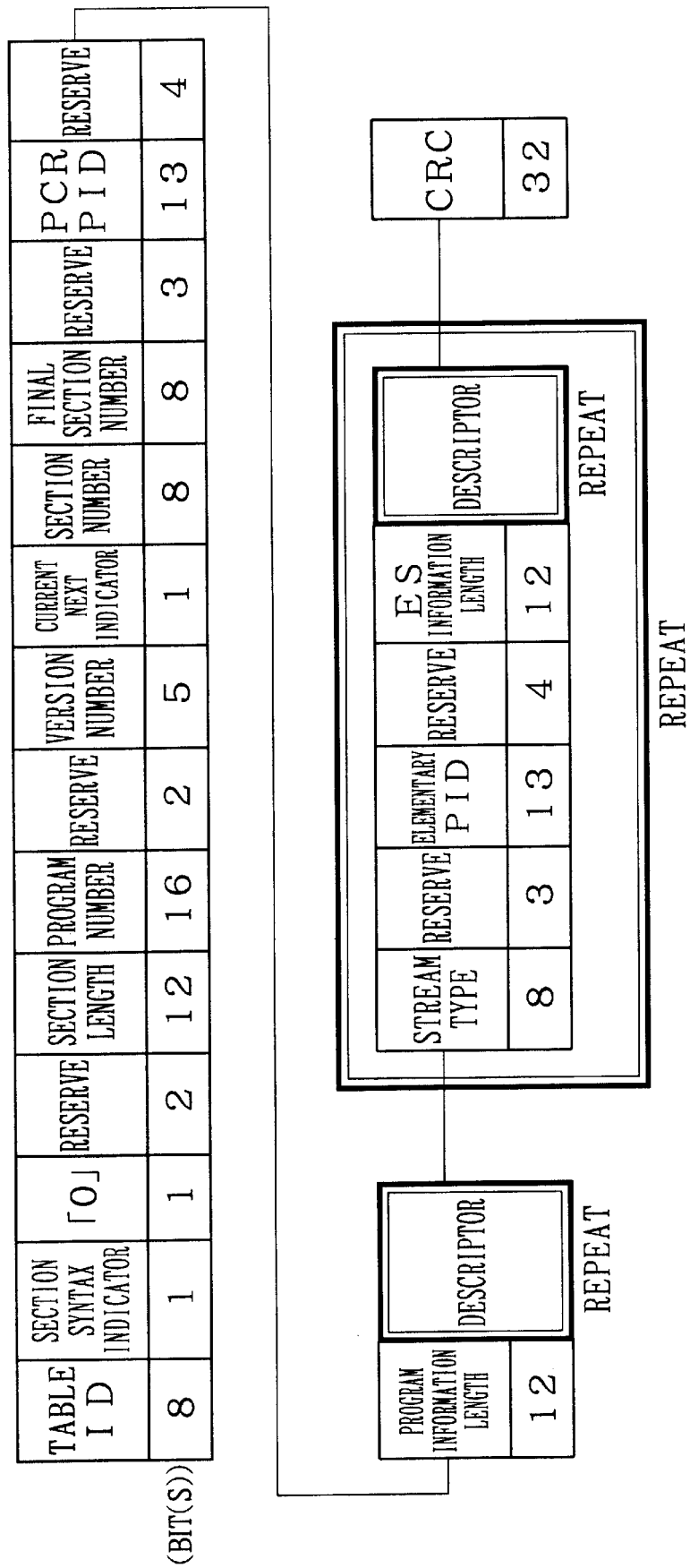
FIG. 6 is a diagram illustrating a table structure of a program map table (PMT)

FIG. 6 shows a table structure of the PMT. An explanation will be made of principal contents which does not overlap with the PAT. A table ID indicates the classification of a table and is given as "0x02" in the case of the PMT. A PCR PID indicates a PID of the packet including a program clock reference (PCR) defined as the reference upon decoding. A stream type indicates the type of signal transmitted in the form of a stream such as video, audio and added data. Further, the NIT indicates physical information on a transmission path, i.e., satellite orbits, polarized waves, frequencies every transponders, etc., in the case of a satellite. As described above, the PAT specifies the PID of the NIT itself.

Figure 7:
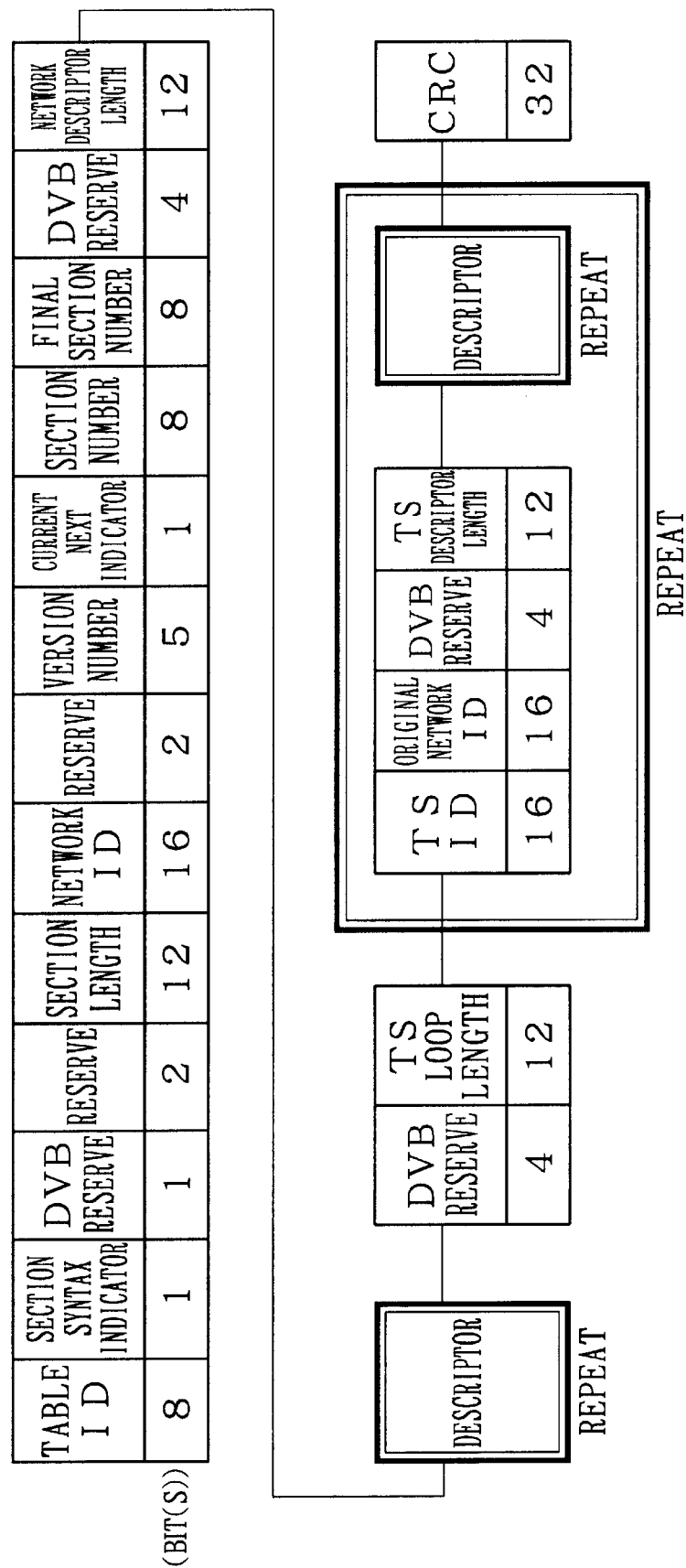
FIG. 7 is a diagram illustrating a table structure of a network information table (NIT)

FIG. 7 indicates a table structure of the NIT. An explanation will be made of principal contents thereof, which does not overlap with the PAT and PMT. A table ID indicates the type of table. The corresponding network is given as "0x40" and other networks are given as "0x41". A network ID is used to identify each network. In the case of satellites, the network ID corresponds to each satellite.

An explanation will further be made of two descriptors that play an important role as some of the NIT. First, a satellite delivery system descriptor will be explained. This type of descriptor is used as a first descriptor repeated in accordance with a TS (Transport Stream) descriptor length and is set as a pair together with a TSID.

Figure 8:
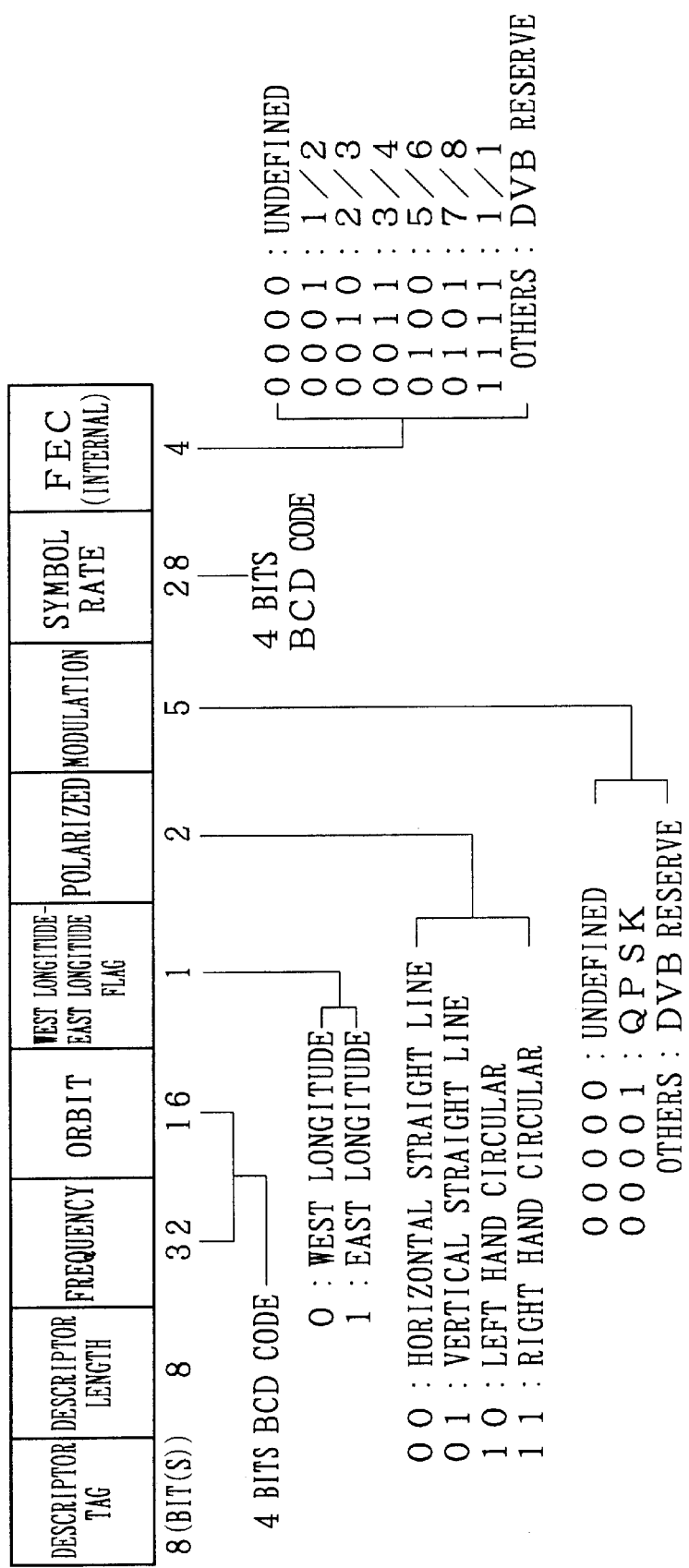
FIG. 8 is a diagram illustrating a structure of a satellite delivery system descriptor in NIT.

FIG. 8 shows the structure of the satellite delivery system descriptor. A descriptor tag is defined by a DVB and indicates the classification of each descriptor. In this descriptor, it is given as "0x43". The frequency indicates a transmission frequency for each stream (transponder herein). An orbit, a west longitude-east longitude and a polarized wave indicate the orbit and polarized wave of a satellite, respectively. A modulation, a symbol rate and a forward error correction code (internal code) rate indicate specifications related to a transmission system, respectively.

Secondary, a service list descriptor will be explained. This service list descriptor is used as second or later descriptors repeated in accordance with a TS (Transport Stream) descriptor length. The service list descriptor also indicates an ID of a service (channel) multiplexed onto the corresponding stream (the transponder here). Namely, a plurality of service list descriptors are attached to one TSID.

Figure 9:
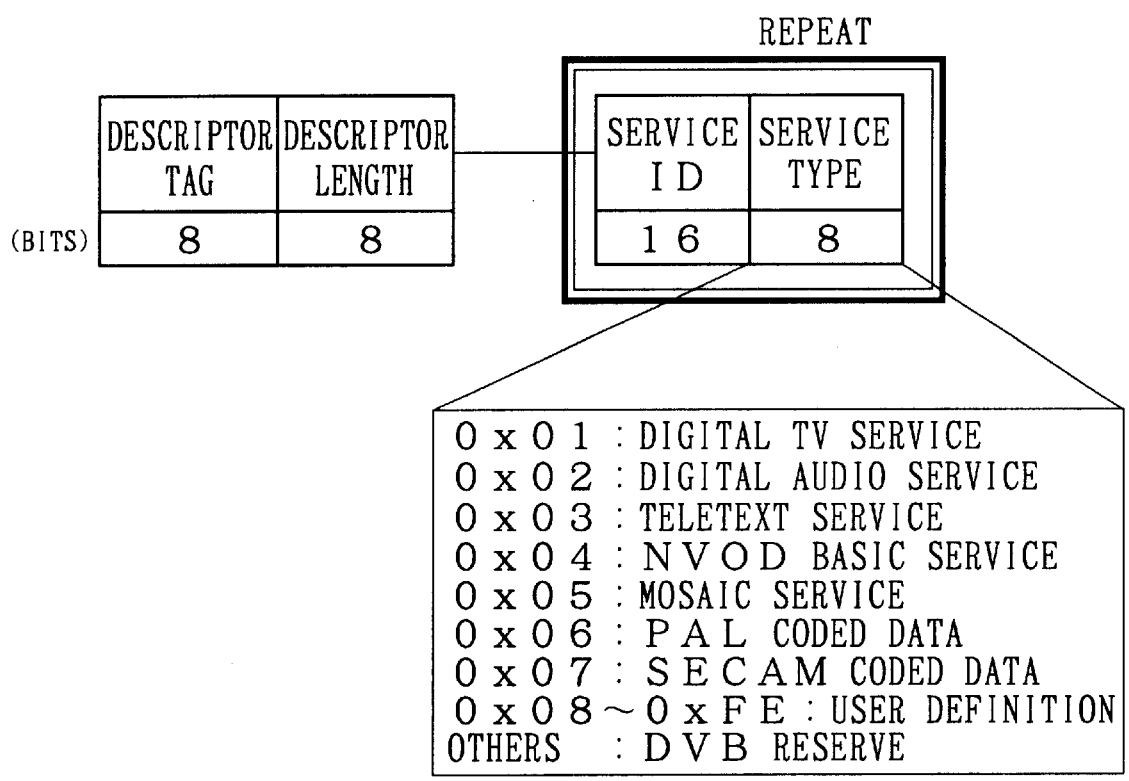
FIG. 9 is a diagram illustrating a structure of a service list descriptor in NIT.

FIG. 9 shows the structure of the service list descriptor. A descriptor tag is defined by a DVB and indicates the classification of each descriptor. In this descriptor, it is given as "0x41". A service ID is used to identify each service. The service normally corresponds to a channel to be selected by a viewer. A service type indicates the contents of services such as an image, voices, data, etc.

An example of the operation of the receiver for receiving the above-described digital broadcast signals transmitted form the communication satellite 20 will be explained briefly. In the PAT and the PMT, each of the program numbers corresponds to a channel number selected by the viewer and the service ID corresponds to a channel number selected by the viewer in the NIT, respectively. Further, the NIT includes information about the entire network, i.e., all the transponders and makes the same tables transmitted in parallel through all the transponders, whereas the PAT and the PMT respectively comprise only information about transmitted programs lying within transponders, and are different in contents from one another every transponders.

Now consider where a viewer has selected an "M" channel through the receiver. After the receiver has received an NIT through a fixed PID, "M" is searched for a service ID in a service list descriptor of the NIT. A satellite delivery system descriptor provided before the service list descriptor including the service ID"M" in combination is received and the frequency of a transponder transmitting the "M" channel is recognized to thereby control a received frequency. Thereafter, a PAT is detected from a digital broadcast signal sent from the transponder transmitting the "M" channel and "M" is searched for a program number lying within the PAT.

After the program number "M" in the PAT has been recognized, a PMT is received by a program map PID attendant to the program number "M" in the PAT. Elementary PID every stream types (video, audio, etc.), corresponding to the program number "M" in the PMT are recognized. Thereafter, transport stream packets having PID coincident with the elementary PID are separated from one another. Respective decoders decode the respective separated packets and output a video signal, an audio signal, etc. lying in the "M" channel selected by the viewer.

Figure 10:
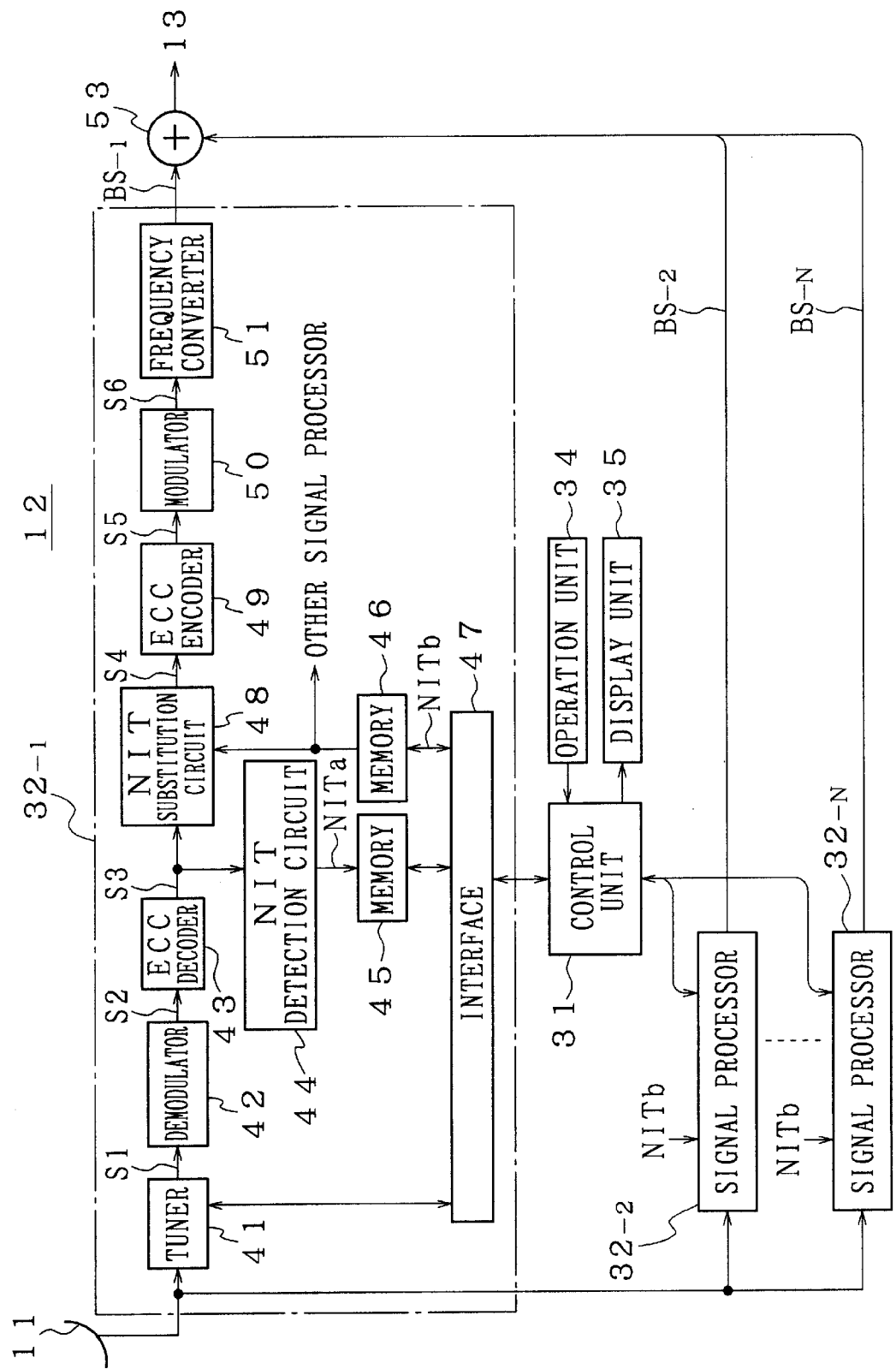
FIG. 10 is a block diagram showing a configuration of a preferred transmitting device for modulation and conversion included in a digital CATV system.

FIG. 10 shows a configuration of the transmitting device for modulation and conversion 12 of the digital CATV system 10, as shown in FIG. 1. Said transmitting device 12 changes a transmission frequency of the digital broadcast signal sent from the first through Nth transponders (satellite repeaters) of a communication satellite 20, a modulation scheme thereof, etc. to generate a CATV digital broadcast signal and transmit it to a transmission path 13.

Incidentally, each of the digital broadcast signals includes the programs multiplexed by a multi-channel.

The transmitting device 12 is provided with a microcomputer and comprises a control unit 31 for controlling the operations of the whole of the transmitting device, first through Nth signal processors 32-1 through 32-N for converting the digital broadcast signal lying within SHF (Super High Frequency) band sent from the first through Nth transponders of the communication satellite 20 to the digital broadcast signal lying within VHF (Very High Frequency) band or UHF (Ultra High Frequency) band to generate digital broadcast signals BS-1 through BS-N for CATV, and an adder 53 for adding together said digital broadcast signals BS-i through BS-N and transmitting the added signals to the transmission path 13.

A operation unit 34 for operating a setting of frequency received by a tuner of each of the signal processors 32-1 through 32-N or the like and a display unit 35 composed of a liquid crystal display etc., for displaying a state of the transmitting device 12 are connected to the said control unit 31, respectively.

The signal processor 32-1 comprises a tuner 41 for selecting a digital broadcast signal sent from a first transponder of the communication satellite 20 out of a plurality of digital broadcast signals lying within an SHF band received by an antenna 11, and performing frequency-converting processing on the selected digital broadcast signal to obtain a QPSK-modulated signal S1, a demodulator 42 for demodulating the QPSK-modulated signal S1 to obtain a signal S2 having a DVB frame configuration, and an ECC (Error correction Code) decoder 43 for performing an error correction on the signal S2 demodulated by the demodulator 42 to successively obtain MPEG2 transport packets S3 as digital broadcast data.

Further, the signal processor 32-1 comprises an NIT detection circuit 44 for detecting an NIT (Network Information Table) from the MPEG2 transport packets S3 successively outputted from the ECC decoder 43, and a memory 45 for storing a table NITa detected by the NIT detection circuit 44 and a memory 46 for storing a NITb being applicable to CATV, obtained by changing the table NITa stored in the memory 45 by means of the controller 31. The NIT detection circuit 44 detects the NIT based on the fixed PID.

Figure 11:
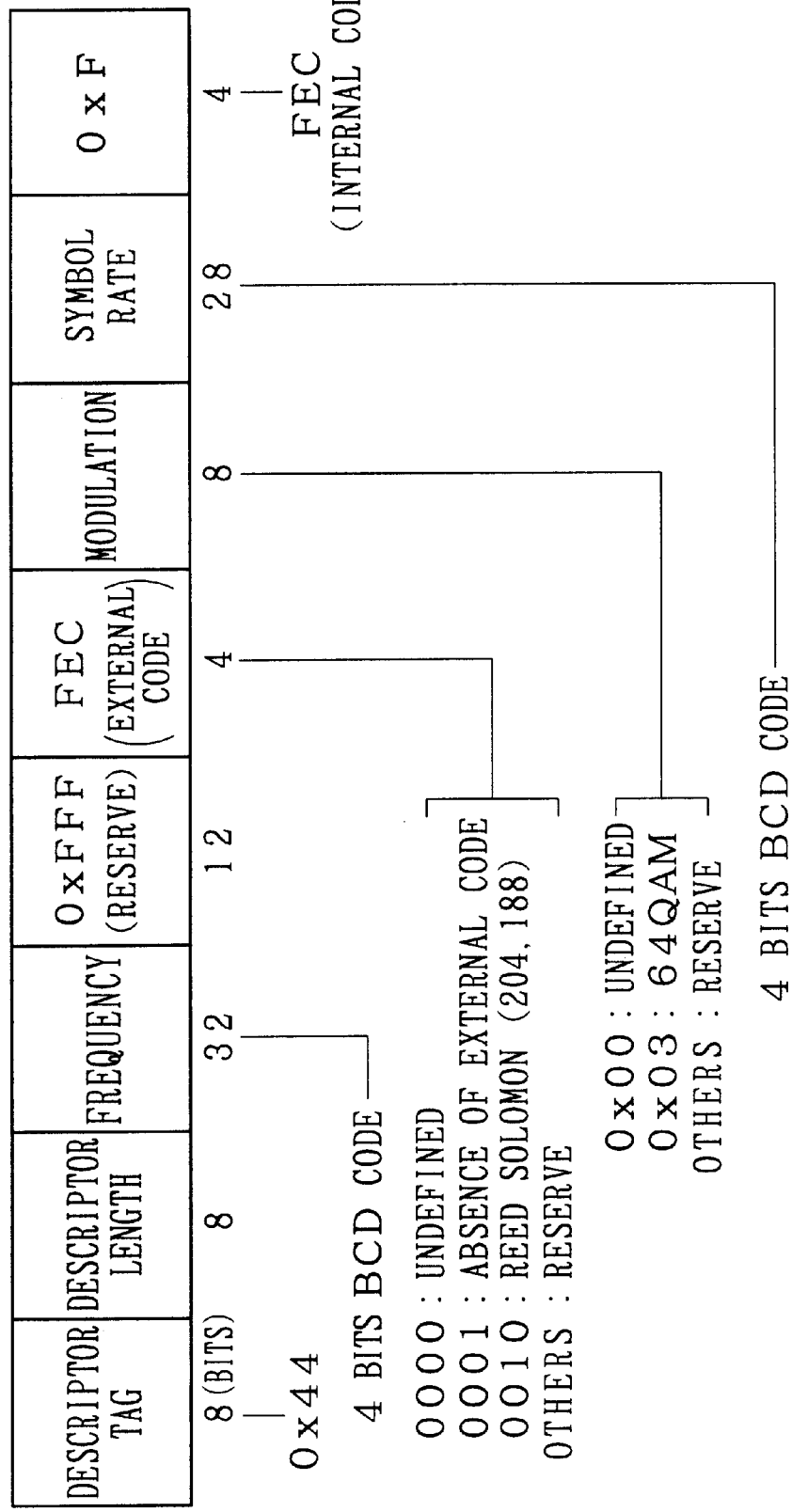
FIG. 11 is a diagram illustrating a structure of a CATV delivery system descriptor.

Since the table structure of the NIT in the digital broadcast data related to the communication satellite 20 is represented as shown in FIG. 7 as described above, a table structure of the table NITa detected by the NIT detection circuit 44 is also similar to the above. In the controller 31, a satellite delivery system descriptor (see FIG. 8) having transmission frequency information or the like in the table NITa is changed to a CATV delivery system descriptor whose structure is shown in FIG. 11, upon obtaining the table NITb.

Principal contents thereof will be described. A descriptor tag is defined by a DVB and indicates the classification of each descriptor. It is given as "0x44" in this descriptor. The frequency indicates a transmission frequency for each stream (multiplexed coded data) in CATV. An FEC (external code) indicates a forward error correction code as an external code, which is given as "0010" in this descriptor. A modulation, a symbol rate and an FEC (internal code) indicate specifications about a transmission system, respectively.

Incidentally, there may be cases in which the number of the digital broadcast signals in CATV is less than the number of digital broadcast signals in satellite digital broadcasting. Namely, when the communication satellite 20 has L transponders and the number of the digital broadcast signals in the satellite digital broadcasting is L, N (N<L) digital broadcast signals of the L digital broadcast signals might be selectively used in CATV. In this case, the controller 31 deletes information related to a TS (Transport Stream) ID corresponding to each digital broadcast signal unused in CATV in the table NITa upon obtaining the table NITb. In FIG. 7, such information to be deleted corresponds to the information about the transport stream ID to descriptor.

The controller 31 controls writing and reading of the memories 45 and 46 through an interface 47. The controller 31 also controls the received frequency of the tuner 41 through the interface 47 as described above.

The signal processor 32-1 comprises an NIT substitution circuit 48 for detecting an NIT from the MPEG2 transport packets S3 successively outputted from the ECC decoder 43 and substituting the table NITb stored in the memory 46 for the NIT. Even in the NIT substitution circuit 48, the corresponding NIT is detected based on the fixed PID. When the information about the TS (Transport Stream) ID corresponding to the digital broadcast signal unused in CATV in the table NITa is deleted by the controller 31 as described above upon obtaining the table NITb, the NIT substitution circuit 48 inserts dummy bits into a portion related to the deleted information.

The signal processor 32-1 comprises an ECC encoder 49 for performing addition or the like of error correction codes of reed solomon (204, 188) to the MPEG2 transport packet S4 in which the NIT is replaced through the NIT substitution circuit 48, thereby obtaining a signal S5 (see FIG. 2B) of a DVB frame configuration, a modulator 50 for performing a 64 QAM (Quadrature Amplitude Modulation) modulating process on this signal S5, and a frequency converter 51 for converting a frequency of the 64 QAM-modulated signal outputted from the modulator 50 to a digital broadcast signal BS-1 for CATV lying within a VHF band or a UHF band.

Another signal processors 32-2 through 32-N respectively comprises a tuner 41, a demodulator 42, an ECC decoder 43, an interface 47, an NIT substitution circuit 48, an ECC encoder 49, modulator 50 and a frequency converter 51, as in the case of the above signal processor 32-1.

Each of the NIT substitution circuits 48 of the signal processors 32-2 through 32-N substitutes the NITb stored in the memory 46 of the signal processor 32-1 for the NIT. Further, each of the tuner 41 of the signal processors 32-2 through 32-N selects the corresponding digital broadcast signal sent from the second through Nth transponders of the communications satellite 20 out of a plurality of the digital broadcast signals received by the antenna 11 so that said digital broadcast signal is frequency-converted to obtain a QPSK-modulated signal S1. The control unit 31 controls the received frequency of each of the tuner 41 of the signal processors 32-2 through 32-N by the interface 47.

Each of the frequency converters 51 of the signal processors 32-2 through 32-N converts the transmission frequency of the digital broadcast signal BS-1 through BS-N so as to become different to one another.

The operation of the transmitting device for modulation and conversion 12 as shown in FIG. 10 will be explained. A plurality of digital broadcast signals lying within an SHF band, which are received by the antenna 11, are supplied to the tuner 41 of the signal processor 32-1. The tuner 41 selects a digital broadcast signal transmitted from a first transponder of the communication satellite 20 and performs frequency conversion processing on the digital broadcast signal to thereby obtain QPSK-modulated signal Si. The QPSK-modulated signal S1 is supplied to the demodulator 42 where a demodulating process is effected on the QPSK-modulated signal S1 to thereby obtain a signal S2 of a DVB frame configuration (see FIG. 2B). Further, the signal S2 of the DVB frame configuration is supplied to the ECC decoder 43 where an error correcting process is effected on the signal S2 of the DVB frame configuration to thereby successively obtain MPEG2 transport packets S3 as digital broadcast data (see FIG. 2A).

The MPEG2 transport packet S3 successively outputted from the ECC decoder 43 are supplied to the NIT detection circuit 44, where an NITa is detected from the MPEG2 transport packets S3. The detected table NITa is supplied to the memory 45 where it is stored therein. For example, such operation of detection of the NITa by the NIT detecting circuit 44 is carried out at once a day.

The control unit 31 reads the corresponding table NITa from the memory 45 and changes a satellite delivery system descriptor (see FIG. 8) in the table NITa to a CATV delivery system descriptor (see FIG. 11). Further, the controller 31 deletes information about a TS (Transport Stream) ID corresponding to each digital broadcast signal unused in CATV in the table NITa, for example to thereby obtain a table NITb applicable to the CATV. Thereafter, the controller 31 causes the memory 46 to store the table NITb therein.

Further, the MPEG2 transport packets S3 successively outputted from the ECC decoder 43 are supplied to the NIT substitution circuit 48 where an NIT is detected and the table NITb stored in the memory 46 is substituted for said the NIT. When, in this case, the information about the TS ID corresponding to each digital broadcast signal unused in the CATV in the table NITa is deleted by the controller 31 upon obtaining the table NITb, the NIT substitution circuit 48 inserts dummy bits into a portion related to the deleted information.

An MPEG2 transport packet S4 by which the NIT is replaced through the NIT substitution circuit 48, is supplied to the ECC encoder 49 where, for example, error correction codes of reed solomon (204, 188) are added thereto to thereby form a signal S5 of a DVB frame configuration. The signal S5 having the DVB frame configuration is supplied to the modulator 50 where a 64 QAM modulating process is effected on the signal 5S having the DVB frame configuration to thereby obtain a 64 QAM-modulated signal S6. The 64 QAM-modulated signal S6 is supplied to the frequency converter 51 where a frequency converting process is performed on the 64 QAM-modulated signal to thereby obtain a CATV digital broadcast signal BS-1 having a predetermined transmission frequency lying within the VHF band or the UHF band.

Similarly, a plurality of the digital broadcast signals lying within the SHF band, which are received by the antenna 11, are supplied to the signal processors 32-2 through 32-N. Each of the tuners 41 selects a digital broadcast signal from the signals transmitted from the second through Nth transponders of the communication satellite 20 and performs frequency conversion processing on the selected digital broadcast signal to thereby obtain QPSK-modulated signal S1. The same process as processed in the signal processor 32-1, for example, the substitution process for each of the NIT substitution circuits 48 to substitute the table NITb stored in the memory 46 of the signal processor 32-1 for the NIT, is performed in the signal processors 32-2 through 32-N. Thereby, CATV digital broadcast signals BS-2 through BS-N each having a predetermined transmission frequency lying within the VHF band or the UHF band may be obtained.

Said digital broadcast signals BS-1 through BS-N obtained by the signal processors 32-1 through 32-N as described above are supplied to the adder 53 for adding them and transmitting the added signals to the transmission path 13 of CATV.

For this reason, such CATV digital broadcast signals BS-1 through BS-N changes only NIT out of a PSI (Program Specification Information) in digital satellite broadcasting. Thus, at the STB (Set Top Box) 14-1 through 14-m used as receiving terminals, which are connected to the transmission path 13 of CATV, the same operation for selecting channel as the operation for selecting channel at the receiver of the digital satellite broadcasting may be performed.

As explained above, on this preferred embodiment, in the transmitting device for modulation and conversion 12, the NITa is detected from MPEG2 transport packet S3 as the digital broadcast data of the digital satellite broadcasting (a first network) and said detected table NITa is changed to the table NITb applicable to CATV (a second network), and then the NITb is substituted for NIT of the MPEG2 transport packet S3 as the digital broadcast data of the digital satellite broadcasting to obtain MPEG2 transport packet S4 as the digital broadcast data of CATV.

Thereby, it is possible to transmit the digital broadcast program broadcast in the digital satellite broadcasting to the CATV.

Figure 12:
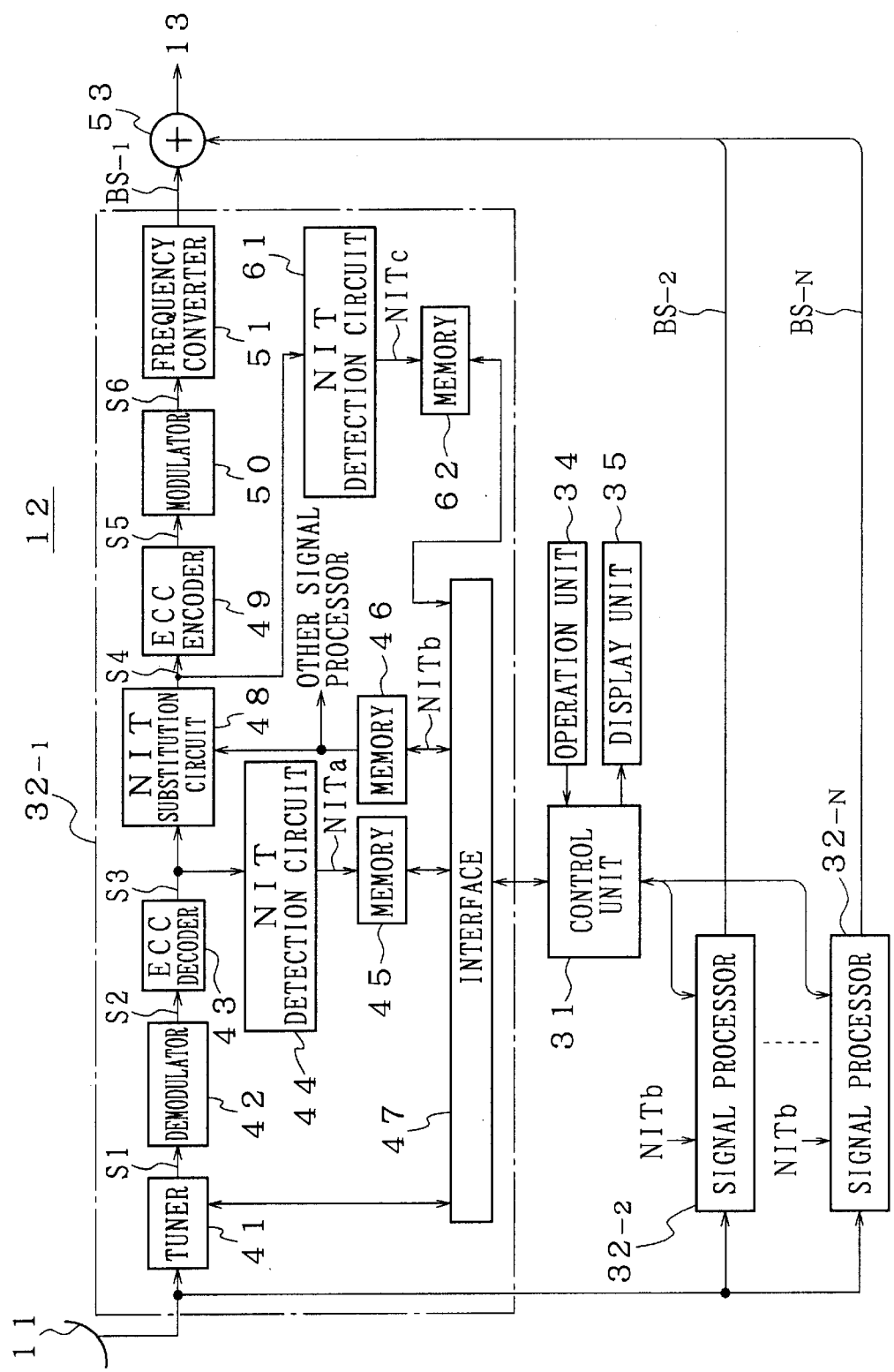
FIG. 12 is a block diagram showing a configuration of another preferred transmitting device for modulation and conversion included in a digital CATV system.

FIG. 12 shows a configuration of the transmitting device for modulation and conversion 12 of another preferred embodiment of the invention.

In the FIG. 12, the parts similar to those previously described with reference to the FIG. 10 are denoted by the same symbols. Thus, the detailed explanation on said parts is omitted.

The signal processor 32-1 of this embodiment comprises an NIT detecting circuit 61 for detecting a table NITc from the MPEG2 transport packet S4 the NIT of which the NIT substitution circuit 48 has substituted, and a memory 62 for storing the table NITc detected by said NIT detecting circuit 61. Said NIT detecting circuit 61 detects the NITc based on the fixed PID. The controller 31 controls writing and reading of the memory 62 through an interface 47.

The controller 31 compares the table NITc detected by the NIT detecting circuit 61 and stored in the memory 62, and the table NITb for substitution stored in the memory 46. The controller 31 also determines whether or not the NIT substitution circuit 48 of the signal processor 32-1 substitutes the NIT correctly. In this case, when the NITc is coincided with the NITb, it is determined that the NIT substitution circuit 48 of the signal processor 32-1 substitutes the NIT correctly.

Further, signal processors 32-2 through 32-N, not shown, comprise also an NIT detecting circuit 61 and a memory 62 as in the case of the signal processor 32-1. Similarly, the controllers 31 of the signal processors 32-2 through 32-N compare the tables NITc stored in the memory 62 of the signal processors 32-2 through 32-N and the tables NITb stored in the memory 46 of the signal processor 32-1. Thereby, the controllers 31 determine whether or not the NIT substitution circuits 48 of the signal processors 32-2 through 32-N substitute the NIT correctly.

A display unit 35 displays under the control of the controller 31 the result determined by the controller 31 whether or not the NIT substitution circuits 48 of the signal processors 32-1 through 32-N substitute the NIT correctly, as described above.

Further, when the controller 31 determines that the NIT substitution circuits 48 of the signal processors 32-1 through 32-N fail to perform the correct substitutions of NIT, for example, the NIT detecting circuit 44 detects again NITa, the detected table NITa is changed and thereby a new table NITb is obtained, and the substitution circuits 48 of the signal processors 32-1 through 32-N may substitute the new NITb for the table NIT.

Referring to FIG. 12, the transmitting device for modulation and conversion 12 is comprised of parts as shown therein, and thus, it is possible to determine whether or not the NIT substitution circuits 48 of the signal processors 32-1 through 32-N substitute the NIT correctly and the display unit 35 may represent the determined result. Thereby, a user may know with ease whether the NIT substitution circuits 48 of the signal processors 32-1 through 32-N substitute the NIT correctly. When the substitution of NIT fails to be correctly performed, the user can deal with said problem promptly.

Further, since such a check circuit is incorporated into the transmitting device 12, the configuration of the system of this invention may be more simply formed than that of the system that the check circuit is externally set. This invention allows the construction of system with high reliability, while said system saves the space and has a low cost.

In the case of the embodiment shown in FIG. 12, the transmitting device for modulation and conversion 12 has separately the memory 45 for storing the table NITa detected by the NIT detecting circuit 44 and the memory 62 for storing the table NITc detected by the NIT detecting circuit 61. However, only the memory 45 may be used, not using the memory 62, because the NIT detecting circuit 44 detects the NIT once a day. Thereby, this invention makes possible the decrease of the amount of necessary storage capacity of the memory and allows the system to save the cost thereof.

According to this embodiment, the NIT of the digital broadcast data on the first network is detected, and said detected NIT is so changed as to be applicable to the second network, the NIT substitution circuit substitutes said changed NIT for the NIT of the digital broadcast data on the first network to obtain the digital broadcast data on the second network. Thus, the digital broadcast program broadcast on the first network may be transmitted to the second network.

Further, according this embodiment, the NIT is detected from the digital broadcast data where the NIT substitution means has substituted the NIT, it is possible to determine whether or not the NIT substitution means substitutes the NIT correctly by comparing said detected NIT and the NIT changed by the table changing means, and the display unit may represent the determined result. Thereby, a user may know with ease whether the substitution of NIT is correctly performed. When the substitution of NIT fails to be correctly performed, the user can deal with said problem promptly.

Since such a check circuit is incorporated into the transmitting device 12, the configuration of the system of this invention may be more simply formed than that of the system that the check circuit is externally set. This invention allows the construction of system with high reliability, while said system saves the space and has a low cost.

Figure 13:
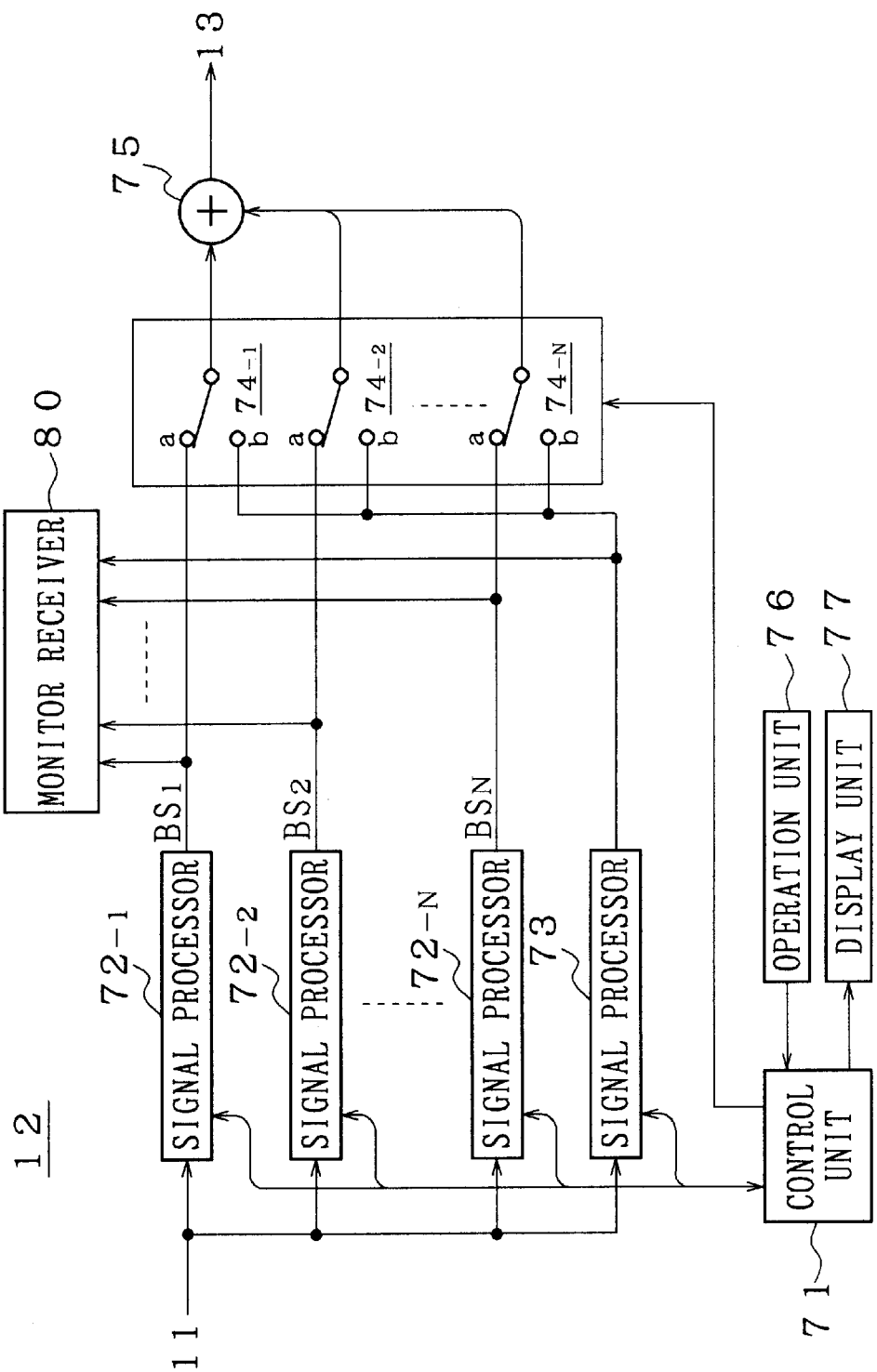
FIG. 13 is a block diagram showing a configuration of still another preferred transmitting device for modulation and conversion included in a digital CATV system.

Next, referring to FIG. 13, the still another preferred embodiment of this invention will be explained. FIG. 13 shows still another example of a configuration of the transmitting device for modulation and conversion 12 as shown in FIG. 10. This transmitting device 12 is provided with a microcomputer and comprises a controller 71 for controlling the operation of the entire device, signal processors 72-1 through 72-N for processing digital broadcast signals lying in an SHF (Super High Frequency) MHz band respectively, which are sent from first through Nth transponders of the communication satellite 20, to thereby generate CATV digital broadcast signals BS-1 through BS-N each lying in a VHF (Very High Frequency) band or a UHF (Ultra High Frequency) band, a signal processor 73 used as a spare (redundant) processor, changeover switches 74-1 through 74-N for selectively outputting the signals from the signal processors 72-1 through 72-N or the signal from the signal processor 73, and an adder 75 for adding together signals outputted from the switches 74-1 through 74-N and transmitting the added signals to the transmission path 13.

An operation unit 76 for causing a user to perform setting of received frequencies of tuners (not shown) of the signal processors 72-1 through 72-N, setting of a converted frequency of a frequency converter (not shown), etc. and for operating an input or the like when any of the signal processors 72 fails or when its failure is removed, and a display unit 77 comprised of a liquid crystal display or the like, for displaying the state of the transmitting device 12 or the like, are electrically connected to the controller 71. Further, the output sides of the signal processors 72-1 through 72-N are electrically connected to their corresponding fixed terminals on the a sides of the respective switches 74-1 through 74-N, whereas the output side of the signal processor 73 is electrically connected to fixed terminals on the b sides thereof in common. Moreover, movable terminals of the switches 74-1 through 74-N are electrically connected to the input sides of the adder 75, respectively.

The controller 71 controls switching operation between the switches 74-1 through 74-N. Normally, the switches 74-1 through 74-N are connected to the a sides thereof and the digital broadcast signals BS-1 through BS-N generated by the signal processors 72-1 through 72-N are supplied to the adder 75.

On the other hand, when any of the signal processors 72-1 through 72-N fails and the user inputs information about its failure via the operation unit 76, the switch corresponding to the faulty signal processor is switched to the b side thereof so that the signal processor 73 is brought to a state in use in place of the faulty signal processor. In this case, a received frequency of a tuner, a converted frequency of a frequency converter and the like for the signal processor 73 are controlled so that they are coincided with those of the faulty signal processor. Thus, a digital broadcast signal similar to that obtained in the faulty signal processor is generated from the signal processor 73.

Further, when a failure in the faulty signal processor is removed and the user inputs information about its removal via the operation unit 76, the changeover switch corresponding to the failure-removed signal processor is switched to the a side thereof so that the failure-removed signal processor is placed in a state in use in place of the signal processor 73 used as the spare. Thus, the signal processor 73 is restored to a standby state as spare (redundant).

Incidentally, the user can make a decision as to whether the signal processors 72-1 through 71-N and 73 have failed or their failures have been removed, by supplying the digital broadcast signals outputted from the respective signal processors 72-1 through 71-N and 73 to a monitor receiver 80 and checking received images related to their digital broadcast signals, as illustrated in the drawing by way example.

Figure 14:
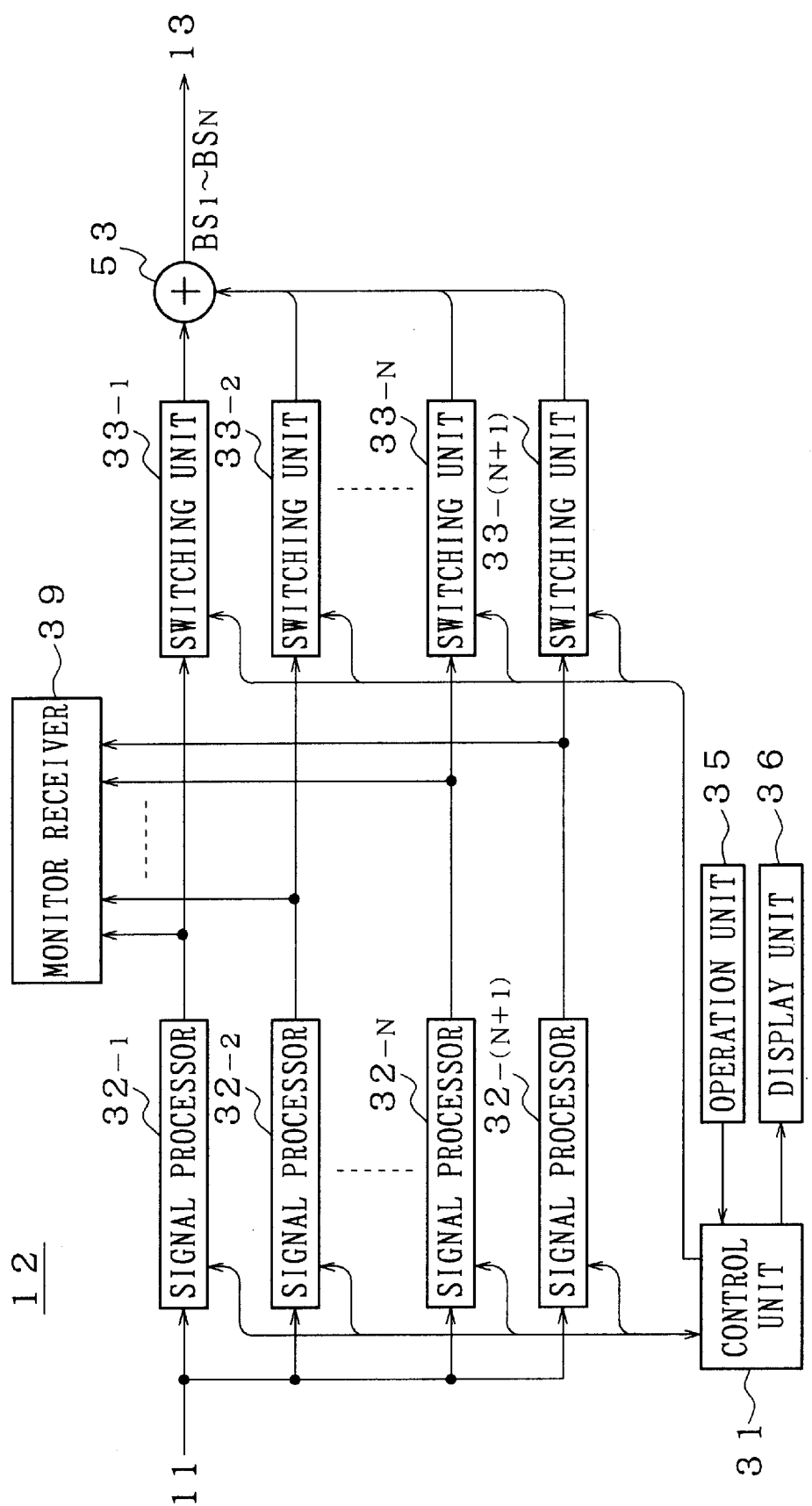
FIG. 14 is a block diagram showing a configuration of a further preferred transmitting device for modulation and conversion included in the digital CATV system.

Further preferred embodiment of the present invention will hereinafter be explained with reference to the FIG. 14. FIG. 14 shows a configuration of a transmitting device for modulation and conversion 12 as a further preferred embodiment. Said transmitting device 12 is used in place of the transmitting device 12 in the digital CATV system 10 shown in FIG. 1. The transmitting device 12 of this embodiment relates to the improvement of the changeover switch of the embodiment as shown in FIG.13.

The transmitting device 12 is provided with a microcomputer. The transmitting device 12 comprises a controller 31 for controlling the operation of the entire device, the first through N+1 th signal processors 32-1 through 32-(N+1) for processing the digital broadcast signals lying in an SHF band, which are sent from a communication satellite 20, and generating a CATV digital broadcast signal lying within the VHF band or the UHF band, switch units 33-1 through 33-(N+1) respectively provided on the output sides of the respective signal processors 32-1 through 32-(N+1), and an adder 53 for adding together the signals outputted from the respective switch units 33-1 through 33-(N+1) and transmitting the added signals to a transmission path 13.

An operation unit 35 for causing a user to perform setting of the transmission frequencies of digital broadcast signals to be received, which are sent from first through Nth transponders (satellite repeaters) of the communication satellite 20 and giving an input when any of the N signal processors being in use fails, and a display unit 36 comprised of a liquid crystal display or the like, for displaying the state or the like of the transmitting device 12 are electrically connected to the controller 31.

The controller 31 controls the conduction and interruption of the switch units 33-1 through 33-(N+1). In this case, the used N switch units of the switch units 33-1 through 33-(N+1), which respectively correspond to the N signal processors being in use, are brought into conduction, whereas one switch unit corresponding to the remaining one signal processor used as a spare one and placed in a standby state, is brought into a cutoff or disconnected state. In the present embodiment, the switch units 33-1 through 33-(N+1) are respectively comprised of variable attenuators. The conducting state of the switch units 33-1 through 33-(N+1) is achieved by the state of the minimum attenuation, and the cutoff state is implemented by the state of the maximum attenuation. Owing to the construction of the switch units 33-1 through 33-(N+1) from the variable attenuators in this way, the generation of noise at the time that each of the switch units 33-1 through 33-(N+1) is brought to the conducting state or is changed to the reversal thereof, can be restrained.

The switching operation of the signal processors 32-1 through 32-(N+1) in the transmitting device 12 as shown in FIG. 14 will be explained.

First of all, the digital broadcast signals lying within the SHF band, which are transmitted from the first through Nth transponders of the communication satellite 20, are respectively processed by the signal processors 32-1 through 32-N. Whereby, digital broadcast signals BS-1 through BS-N lying in the VHF band or the UHF band are generated. The transmission frequencies of said digital broadcast signals BS-1 through BS-N are different in one another. In this case, the signal processors 32-1 through 32-N are in use and the switch units 33-1 through 33-N corresponding to the signal processors 32-1 through 32-N are brought into conduction.

On the other hand, the signal processor 32-(N+1) serves as a spare and is placed in a standby state. Further, the switch unit 33-(N+1) corresponding to the signal processor 32-(N+1) is brought to a cutoff state. In tuners of the signal processors 32-1 through 32-N, their received frequencies are controlled so that they may receive the digital broadcast signals lying in the SHF band, which are transmitted from their corresponding first through Nth transponders of the communication satellite 20.

Let's now assume that, for example, the signal processor 32-1 fails and the digital broadcast signal BS-1 is not satisfactorily generated from the signal processor 32-1 in this state. Incidentally, the user can make with ease a decision as to whether the signal processors 32-1 through 32-(N+1) have failed, by supplying the digital broadcast signals outputted from the signal processors 32-1 through 32-(N+1) to a monitor receiver 39 and checking respective received images related to the digital broadcast signals as shown in the drawing by way of example.

When the signal processor 32-1 fails and the user inputs information about its failure via the operation unit 35, the received frequency of the tuner of the signal processor 32-(N+1) and other processed states are controlled so as to be equal to those of the faulty signal processor 32-1 under the control of the controller 31. Thus, the signal processor 32-(N+1) is brought to a state of generating the digital broadcast signal BS-1. Under the control of the controller 31, the switch unit 33-(N+1) corresponding to the signal processor 32-(N+1) is brought to a conducting state and the switch unit 33-1 corresponding to the faulty signal processor 32-1 is brought to a cutoff state. As a result, the signal processors 32-2 through 32-N and 32-(N+1) are put in use, whereas the signal processor 32-1 serves as a spare and is brought to a standby state.

After the frequency of the tuner of the signal processor 32-(N+1) and other processed states have been controlled so as to obtain the digital broadcast signal BS-1 from the signal processor 32-(N+1) as described above, the switch unit 33-(N+1) is brought into conduction so that only a digital broadcast signal BS-1 similar to one obtained from the faulty signal processor 32-1 can be obtained from the switch unit 33-(N+1).

Incidentally, the faulty signal processor 32-1 is restored while it serves as the spare and is placed in the standby state in this way, and hence the failure is removed therefrom.

Subsequently when any of the N signal processors in use fails and the user inputs its failure information via the operation unit 35, the faulty signal processor is newly placed in a standby state as a spare under the above-described similar control operation, and alternatively each signal processor placed in the standby state as the spare up to now is put into a used state.

Further, a configuration of each of the signal processors 32-1 through 32-(N+1) is the same as that of the signal processor 32-1 as shown in FIG. 10.

In the present embodiment as has been described above, when any of N signal processors being in use fails and a user inputs information about its failure through the operation unit 35, the faulty signal processor newly serves as a spare and is placed in a standby state. As an alternative to this, the signal processors, which have served as the spares and have been placed in the standby state up to now, are put into a used state. Thus, since the spare (redundant) signal processors are constructed so as to be unfixed in the present embodiment, the changeover switches 74-1 through 74-N (see FIG. 13), which perform switching between the used signal processors and the spare signal processor, become unnecessary and only the switch units 33-1 through 33-(N+1) for outputting the signal from the output of the respective signal processors 32-1 through 32-(N+1) may be provided, whereby the present embodiment can be simplified in configuration and configured at low cost.

Since the spare (redundant) signal processors are also constructed so as to be unfixed, there is no need to place the faulty signal processor from the spare signal processor back onto the used signal processor and its management becomes easy, even if the failure in the faulty signal processor is removed.

In the present embodiment, when each spare signal processor is set to the signal processor being in use, the received frequency or the like of the tuner of the spare signal processor is controlled so as to obtain a digital broadcast signal similar to that obtained at the faulty signal processor from the spare signal processor. Thereafter, the switch unit provided so as to correspond to each spare signal processor is brought into conduction. Thus, only the digital broadcast signal similar to that obtained in the faulty used signal processor can be obtained from the switch unit.

Further, the switch units 33-1 through 33-(N+1) are comprised of the variable attenuators respectively in the present embodiment. It is thus possible to restrain the generation of noise at the time that the switch units 33-1 through 33-(N+1) change from the conducting state to the cut-off state or vice versa.

Although the aforementioned embodiment shows the case in which the number of the signal processors in use is N whereas one spare (redundant) signal processor is used, the number of the spare signal processors is not necessarily limited to one. While the configuration is made redundant as the number of the spare signal processors increases, the number of failures handleable once can be made greater.

In the aforementioned embodiments, the present invention is applied to the transmitting device 12 of the digital CATV system 10. It is, however, needless to say that the present invention can be similarly applied to a signal processing device which has a plurality of signal processors and wherein the plurality of signal processors respectively include one or a plurality of spare or redundant signal processors, and which allows one or a plurality of used signal processors of the plurality of signal processors except for the spare signal processors to process one or a plurality of signals in parallel.

Further, the above-described embodiment shows one in which the switching between the switch units 33-1 through 33-(N+1) is automatically performed by the controller 31. However, it is also considered that their switching is manually performed.

According to the present invention, when any one used signal processor of the used signal processors fails, any one spare signal processor of the spare signal processors is set as a used signal processor for processing one signal. Further, the faulty one signal processor is set as the spare signal processor.

Thus, since the spare (redundant) signal processors are constructed so as to be unfixed, changeover switches for performing switching between the used signal processors and the spare signal processors become unnecessary and hence switch units for determining whether respective output signals of a plurality of signal processors should be respectively outputted, may simply be provided on the output sides of the plurality of signal processors, for example, thereby making it possible to provide a simplified configuration and an inexpensive configuration.

Further, since the spare (redundant) signal processors are constructed so as to be unfixed, the need for placing a faulty signal processor from the spare signal processor back onto the used signal processor is eliminated even when a failure of the faulty signal processor is removed, thereby simplifying management thereof.

When a plurality of signal processors respectively have tuner means and processing circuits for processing output signals of the tuner means, and one spare signal processor is set as a used signal processor for processing one signal, for example, a received frequency or the like of the tuner means of one spare signal processor is made coincident with that or the like of the tuner means of one faulty used signal processor. Thereafter, a switch unit provided so as to correspond to one spare signal processor is brought into conduction, whereby only an output signal similar to that obtained in the faulty one used signal processor can be obtained from the switch unit.

Further, since the switch units are comprised of the variable attenuators respectively, it is thus possible to restrain the generation of noise at the time that the switch units change from the conducting state to the cut-off state or vice versa.

While the above is a complete description of the preferred embodiment of the invention, various alternatives, modifications, and equivalents may be used. Therefore, the above description should not be taken as limiting the scope of the invention as defined by the appended claims.

What is claimed is:

1. A signal processing device for converting a first digital broadcast signal having a predetermined transmission frequency on a first network into a second digital broadcast signal having a predetermined transmission frequency on a second network comprising:

demodulating means for demodulating a first digital modulated signal, based on said first digital broadcast signal, to obtain digital broadcast data;

table-detecting means for detecting a table, including physical information relating to a transmission path, from said digital broadcast data obtained by said demodulating means;

table-changing means for changing said table detected by said table-detecting means so that the table is applicable to said second network;

table substitution means for substituting the table changed by said table-changing means for the table of said digital broadcast signal obtained by said demodulating means;

modulating means for modulating said digital broadcast data and the substituted table to obtain a second digital modulated signal; and frequency-converting means for frequency-converting said second digital modulated signal to obtain a second digital broadcast signal.

2. The signal processing device according to claim 1, further comprising second frequency-converting means for frequency-converting said first digital broadcast signal to obtain said first digital modulated signal.

3. The signal processing device according to claim 1, wherein said table-changing means changes at least transmission frequency information included in the table detected by said table-detecting means.

4. The signal processing device according to claim 1, wherein a plurality of digital broadcast signals are received by said signal processing device, and said table-changing means deletes from the detected table information relating to one of said plurality of digital broadcast signals failing to correspond to a digital information signal on said second network when the number of digital broadcast signals on said second network is less than the number of digital broadcast signals on said first network.

5. The signal processing device according to claim 4, wherein said table substitution means inserts a dummy bit to a portion of the table relating to the information deleted by said table-changing means.

6. The signal processing device according to claim 1, further comprising second table-detecting means for detecting the substituted table from the digital broadcast data; and substitution detecting means for comparing the table detected by said second table-detecting means and the table changed by said table-changing means and detecting whether said table substitution means has substituted the table correctly.

7. The signal processing device according to claim 6, further comprising control means for controlling the first-mentioned table-detecting means and the table substitution means so that said first table-detecting means detects the table again from the digital broadcast data modulated by said modulating means when said substitution detecting means detects that said substitution has been carried out incorrectly, whereupon said table substitution means again substitutes the table changed by the table-changing means for the table again detected by the table-detecting means.

8. A signal processing device comprising:

a plurality of signal processors including at least one spare signal processor, wherein at least two of said plurality of said signal processors, other than said spare signal processor, process signals on a parallel basis;

a switch unit for determining whether an output signal is output from each of said plurality of signal processors; and switching control means, operable when one of said plurality of signal processors fails, to switch said spare signal processor to process said signal in place of said signal processor that failed;

wherein each of said plurality of signal processors respectively includes:

tuner means for selecting a first digital broadcast signal having a predetermined transmission frequency from a plurality of digital broadcast signals on a first network and thereby obtaining a first digital modulated signal;

demodulating means for demodulating the first digital modulated signal to obtain first digital broadcast data;

program specific information changing means for changing program specific information about the first digital broadcast data to program specific information suitable to a second network to obtain second digital broadcast data;

modulating means for modulating the second digital broadcast data to obtain a second digital modulated signal; and frequency-converting means for frequency-converting the second digital modulated signal to obtain a digital broadcast signal having a predetermined transmission frequency on the second network.

9. The signal processing device according to claim 8, wherein said switching control means designates said failed signal processor as a spare signal processor.

10. The signal processing device according to claim 8, wherein said switch unit comprises at least one variable attenuator.

11. The signal processing device according to claim 8, wherein when said one spare signal processor is switched into use, said switching control means controls said one spare signal processor to match at least a received frequency of said tuner means and a converted frequency of said frequency converting means associated with said failed signal processor, and thereafter switches a switch unit associated with said one spare signal processor to switch said one spare signal processor in place of said failed signal processor.

12. A signal processing device comprising:

a plurality of signal processors including at least one spare signal processor, wherein at least two of said plurality of said signal processors, other than said spare signal processor, process signals on a parallel basis;

switching control means, operable when one of said plurality of signal processors fails, to switch said spare signal processor to process said signal in place of said signal processor that failed;

wherein said plurality of signal processors respectively includes:

tuner means for selecting a first digital broadcast signal having a predetermined transmission frequency from a plurality of digital broadcast signals on a first network and thereby obtaining a first digital modulated signal;

demodulating means for demodulating the first digital modulated signal to obtain first digital broadcast data;

program specific information changing means for changing program specific information about the first digital broadcast data to program specific information suitable to a second network to obtain second digital broadcast data;

modulating means for modulating the second digital broadcast data to obtain a second digital modulated signal; and frequency-converting means for frequency converting the second digital modulated signal to obtain a digital broadcast signal having a predetermined transmission frequency on the second network.

13. The signal processing device according to claim 12, wherein when said one spare signal processor is switched into use, said switching control means controls said one spare signal processor to match at least a received frequency of said tuner means and a converted frequency of said frequency converting means associated with said failed signal processor.

14. A switching method for switching signal processors suitable for use in a signal processing device, said signal processing device having a plurality of signal processors respectively including tuner means for selecting a first digital broadcast signal having a predetermined transmission frequency from a plurality of digital broadcast signals on a first network and thereby obtaining a first digital modulated signal; demodulating means for demodulating the first digital modulated signal to obtain first digital broadcast data; program specific information changing means for changing program specific information about the first digital broadcast data to program specific information suitable to a second network to obtain second digital broadcast data; modulating means for modulating the second digital broadcast data to obtain a second digital modulated signal; and frequency-converting means for frequency-converting the second digital modulated signal to obtain a digital broadcast signal having a predetermined transmission frequency on the second network; and a circuit for processing said signals output from said tuner means, said method allowing each of said plurality of signal processors, other than a spare signal processor, to process a broadcast signal having a predetermined transmission frequency, said switching method comprising the steps of:

switching said spare signal processor in place of a failed signal processor for processing the broadcast signal having a first transmission frequency;

designating said failed signal processor as a spare signal processor;

setting said tuner means of said spare signal processor to said first transmission frequency; and setting a processing state of said processing circuit included in said spare signal processor to coincide with a processing state of said processing circuit included in said failed signal processor, and thereafter switching said spare signal processor in place of the failed signal processor for processing the broadcast signal having said predetermined transmission frequency.

* * * * *